(12) United States Patent
Mehta

(10) Patent No.: US 10,587,756 B2
(45) Date of Patent: *Mar. 10, 2020

(54) COLLECTING AND CORRELATING MICROPHONE DATA FROM MULTIPLE CO-LOCATED CLIENTS, AND CONSTRUCTING 3D SOUND PROFILE OF A ROOM

(71) Applicant: Akamai Technologies, Inc., Cambridge, MA (US)

(72) Inventor: Abhijit C. Mehta, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,371

(22) Filed: May 14, 2019

(65) Prior Publication Data
US 2019/0268476 A1    Aug. 29, 2019

Related U.S. Application Data

(63) Continuation of application No. 15/857,020, filed on Dec. 28, 2017, now Pat. No. 10,291,783.
(Continued)

(51) Int. Cl.
*H04M 3/56* (2006.01)
*H04L 29/08* (2006.01)
(Continued)

(52) U.S. Cl.
CPC .......... *H04M 3/568* (2013.01); *G10L 19/167* (2013.01); *H04L 65/403* (2013.01);
(Continued)

(58) Field of Classification Search
CPC combination set(s) only.
See application file for complete search history.

(56) References Cited

U.S. PATENT DOCUMENTS

| 2008/0218586 A1* | 9/2008 | Graham | H04L 12/1822 348/14.09 |
| 2011/0161085 A1* | 6/2011 | Boda | G06Q 30/02 704/260 |

(Continued)

*Primary Examiner* — Phung-Hoang J Nguyen
(74) *Attorney, Agent, or Firm* — David H. Judson (57) ABSTRACT

An overlay network platform facilitates a multi-party conference. End users participate in the conference using client-based web browser software, and using a protocol such as WebRTC. According to this disclosure, an enhanced "audio" experience for the conference is providing by collecting and correlating microphone data from multiple co-located clients, and then constructing (at the platform) a three-dimensional (3D) sound profile of the room in which the clients are co-located. By processing in the platform (as opposed to locally at each client), the approach enables platform-side creation of an ad-hoc, high quality microphone array that identifies the relative positions and orientations of the microphones that are being used by the clients. Individual audio streams received from the microphones are combined, and the relative position information (of the individual microphones) is used to render a single audio stream that represents a high quality recording of the audio in the common physical space. Other clients in the conference request, receive and play back this high quality stream to obtain a high-fidelity 3D representation of the audio as if they are physically present in the room.

8 Claims, 5 Drawing Sheets

Related U.S. Application Data (60) Provisional application No. 62/440,509, filed on Dec. 30, 2016.

(51) Int. Cl.

| | | |
|---|---|---|
| *G10L 19/16* | (2013.01) | |
| *H04N 7/15* | (2006.01) | |
| *H04N 7/14* | (2006.01) | |
| *H04L 29/06* | (2006.01) | |
| *H04R 27/00* | (2006.01) | |
| *H04S 7/00* | (2006.01) | |
| *H04S 3/00* | (2006.01) | |
| *G10L 19/008* | (2013.01) | |

(52) U.S. Cl.
CPC ............ *H04L 65/608* (2013.01); *H04L 67/02* (2013.01); *H04L 67/10* (2013.01); *H04L 67/104* (2013.01); *H04L 67/1097* (2013.01); *H04L 67/20* (2013.01); *H04M 3/567* (2013.01); *H04N 7/147* (2013.01); *H04N 7/148* (2013.01); *H04N 7/15* (2013.01); *H04N 7/152* (2013.01); *H04R 27/00* (2013.01); *G10L 19/008* (2013.01); *H04M 2203/509* (2013.01); *H04M 2207/40* (2013.01); *H04R 2227/003* (2013.01); *H04R 2430/01* (2013.01); *H04S 3/008* (2013.01); *H04S 7/302* (2013.01); *H04S 2400/11* (2013.01); *H04S 2400/13* (2013.01); *H04S 2400/15* (2013.01); *H04S 2420/11* (2013.01)

(56) References Cited

U.S. PATENT DOCUMENTS

2014/0149803 A1* 5/2014 Lehofer ............... G06F 11/3495
714/47.1
2017/0133036 A1* 5/2017 Cohen ................... H04M 3/567

* cited by examiner

COLLECTING AND CORRELATING MICROPHONE DATA FROM MULTIPLE CO-LOCATED CLIENTS, AND CONSTRUCTING 3D SOUND PROFILE OF A ROOM

BACKGROUND

Technical Field

This application relates generally to network-based conferencing utilizing a browser and, in particular, to techniques to enhance delivery of audio to conference participants.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Real-time communications (e.g., videoconferencing, shared document editing, screen sharing, and the like) over the Internet have been a part of our daily lives at work and at home. WebRTC, an Internet standard, was created to make videoconferencing and point-to-point data transfer easier to implement. In particular, WebRTC (which stands for Web Real Time Communications) seeks to take the most critical elements of video chat and move them to one of the most commonly used tools for accessing the Internet, namely, a web browser. WebRTC is supported with plugins by both Google Chrome and Mozilla Firefox. It allows the browser to access the client machine's camera and microphone, provides a method for establishing a direct connection between two users' browser and to use that connection to send audio and video, and it provides a method for sending arbitrary data streams across a connection.

BRIEF SUMMARY

An overlay network platform facilitates a multi-party conference. End users participate in the conference using client-based web browser software, and using a protocol such as WebRTC. According to this disclosure, an enhanced "audio" experience for the conference is providing by collecting and correlating microphone data from multiple co-located clients, and then constructing (at the platform) a three-dimensional (3D) sound profile of the room in which the clients are co-located. By processing in the platform (as opposed to locally at each client), the approach enables platform-side creation of an ad-hoc, high quality microphone array that identifies the relative positions and orientations of the microphones that are being used by the clients. Individual audio streams received from the microphones are combined, and the relative position information (of the individual microphones) is used to render a single audio stream that represents a high quality recording of the audio in the common physical space. Other clients in the conference request, receive and play back this high quality stream to obtain a high-fidelity 3D representation of the audio as if they are physically present in the room.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
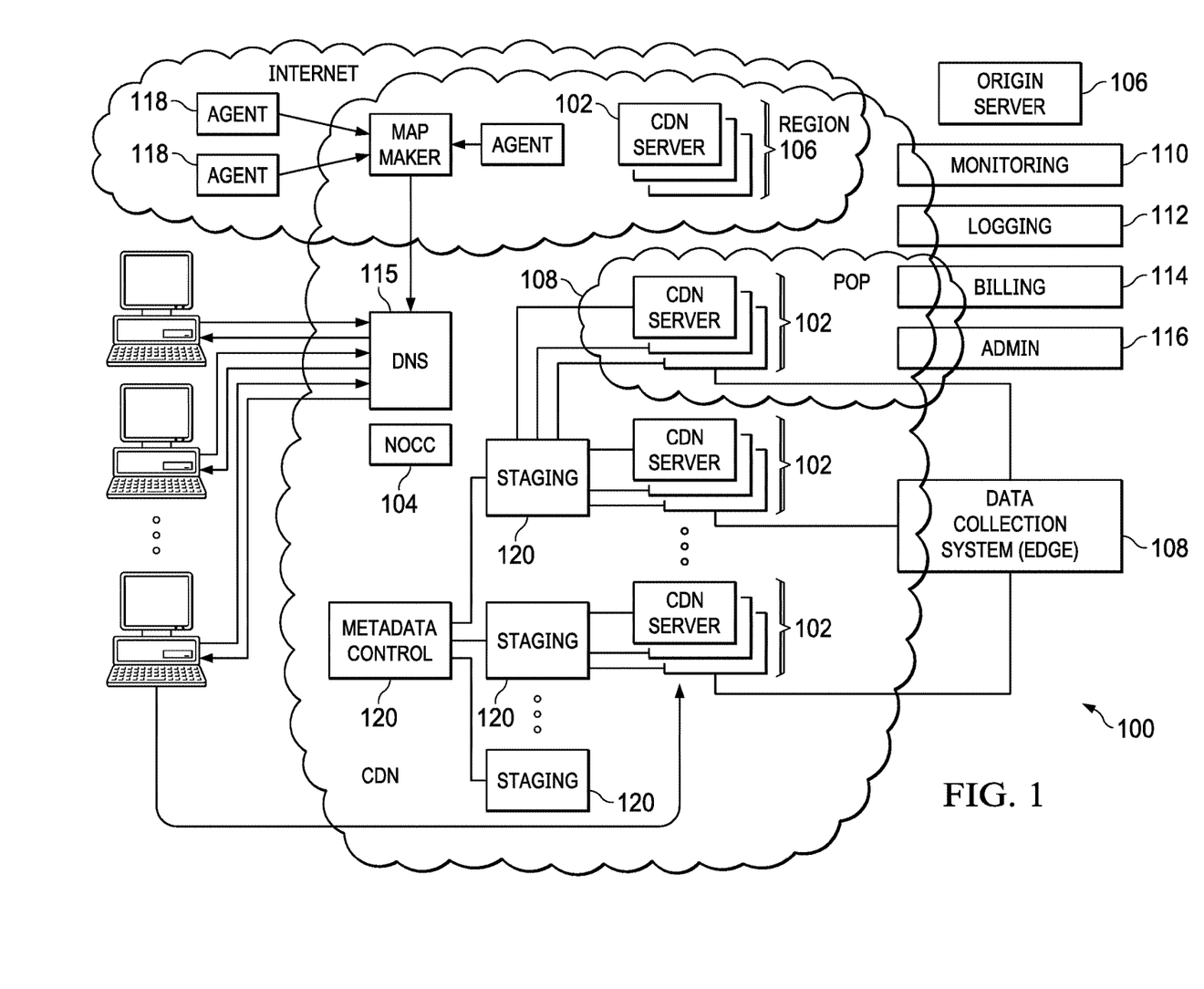
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
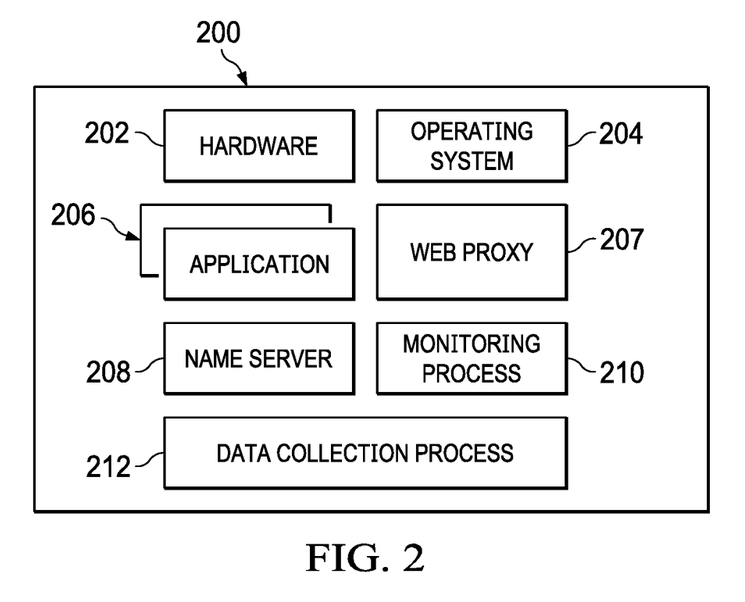
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Unified Browser-Based Enterprise Collaboration Platform Using an Overlay Network The following assumes familiarity with WebRTC.

Traditional point-to-point communication and collaboration tools, such as LifeSize, WebEx, and Skype, require specialized applications and infrastructure. The WebRTC APIs have the potential to make direct point-to-point communication ubiquitous by bringing it to the browser. As described above, WebRTC enables video communication and collaboration without any additional plugins or software. That said, however, there are still a number of challenges remaining for an entity that wants to deploy a WebRTC-based application. Thus, for example, a relay infrastructure (using TURN) is needed to establish connections between two peers behind NATs, and building a robust and scalable relay infrastructure is challenging. Additionally, multi-user video conferencing over WebRTC requires full mesh connectivity between all users; that is, a separate connection must be established between each pair of users. Each user needs to upload their video (and other data) multiple times—once for each peer—and the resources required grow in a way proportional to the square of the number of users, which does not scale. These issues are not limited to WebRTC; indeed, existing, dedicated video conferencing solutions struggle with the same problems. For example, Microsoft's Skype relays are often overloaded, significantly impacting the quality of Skype calls that cannot use a direct peer-to-peer connection. LifeSize needs the same full-mesh connectivity described above, which severely limits the number of different remote sites that can participate in one meeting.

To address these issues, and according to one aspect of this disclosure, an overlay network fabric is used. In particular, by distributing multiplexing and the relay infrastructure over a platform, such as a CDN (as described above), a solution that facilitates multi-user collaboration, such as video conferencing, chat, document sharing, and desktop sharing, is provided. While a primary use case as described below is for high-quality video conferencing that is scalable to large numbers of users, this is not a limitation, as the cloud-supported multiplexing and relay techniques herein may be used to provide other multi-user collaboration, such as chat, document sharing, and desktop sharing, all in a seamless and scalable manner. The overlay network can also provide additional functions and features to support a collaboration session; these may include, without limitation, persistent storage and recording of sessions and documents, integration with existing videoconferencing and telecommunications infrastructure (LifeSize rooms, PSTN, etc.), and others.

Figure 3:
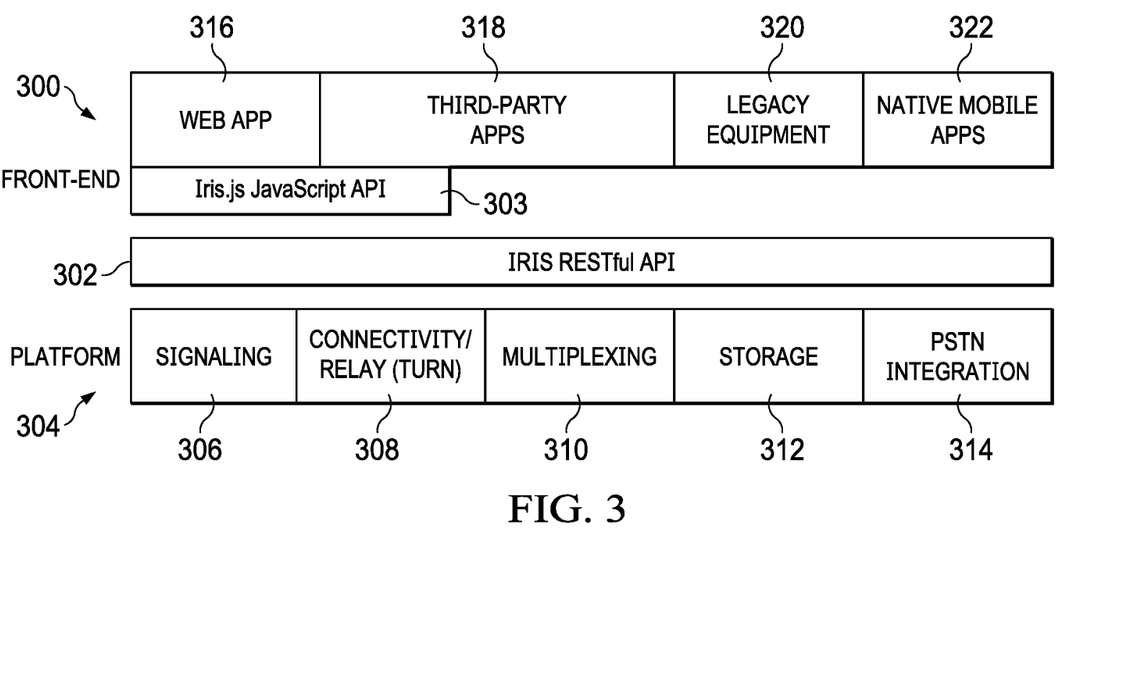
FIG. 3 depicts the various components of a web-based collaboration solution according to this disclosure.

FIG. 3 depicts a representative architecture 300 for an enterprise collaboration platform using an overlay network according to an aspect of this disclosure. There are three primary elements: a front-end application 300, RESTful APIs 302, and a back-end or platform 304. The front-end application (app) 300 preferably is built on a number of components (described below) that are preferably accessed through the one or more RESTful APIs 302. As will be seen, this architecture allows on-premises infrastructure to be integrated with the solution, and it could also be used to allow third parties to create applications powered by the platform. The platform components 304 include signaling 306, connectivity 308, multiplexing 310, storage 312, and PSTN integration 314. In one embodiment, the platform 304 comprises part of an overlay network (or leverages elements thereof), but this is not a requirement, as the solution herein may be provided as a standalone architecture. Further, the notion of a "component" herein may involve multiple machines, whether co-located or distributed, as well as the processes and programs executing thereon.

Turning first to the platform, the signaling component 306 preferably is a distributed signaling system that keeps track of users' state (e.g., "Online", "Away", "Busy", etc.), and it is used to transmit the information (i.e., SDP) necessary to initiate an RTCPeerConnection. The signaling component 306 preferably integrates with various user authentication and identity management solutions, although this is not a requirement. The connectivity component 308 manages video, voice and data connections routed though the overlay network platform to handle Network Access Translation (NAT) traversal, as well as to provide enhanced performance and security.

The multiplexing component 310 comprises multiplexing machines to allow for scalable, multi-peer sessions. This component makes it so that each peer only needs to upload its media stream once. Other peers are then able to access peers' media streams through overlay network edge machines (rather than by direct connections to peers). The multiplexing component provides for multiplexing in the cloud to significantly reduce edge bandwidth requirements that would otherwise be required to support WebRTC (which otherwise dictates a new connection be setup for pair of peers in a multi-user collaboration). With this approach herein of using the overlay network, there is no requirement to setup a new connection for each pair of peers in a multi-peer collaboration (conference, chat, etc.) session.

As will be described, and as a further feature, preferably the multiplexing component 310 intelligently adjusts the quality of different users' streams to enhance performance—e.g., only deliver HD streams for people who are currently speaking, deliver lower-quality streams to mobile devices, etc.

The storage component 312 allows overlay network customers to (optionally) store data from a collaboration session (e.g., record a meeting, save work on a collaborative document, etc.). The PTSN integration component 314 allows users to join sessions from the PSTN and legacy telecommunications equipment, and it allows users to call out over the PSTN. Although not depicted, the platform may include a transcoding component that allows for communications between browsers that do not have the same video codecs implemented, and for one-way broadcasting to browsers that do not support WebRTC.

As noted, the front-end components 300 interact with the back-end platform 304 using an application programming interface, such as RESTful APIs 302. These APIs 302 provide methods for exchanging SDPs to set up calls, provide information on which chat rooms are available, which media streams are available in each chat room, which user media streams in a given chat room are most "relevant" at any given moment, and so forth. The APIs preferably also provide methods for interacting with other parts of the back-end, e.g., verifying users' identities, accessing storage (saving data, retrieving data, searching), and the like. As also depicted, the APIs also preferably include a JavaScript (JS) API 303, referred to herein as "iris.js," which is a thin layer on top of the base WebRTC API and other HTML5 components. The iris.js API 303 preferably uses the other RESTful APIs to integrate with the overlay network fabric. In particular, the iris.js API allows applications to establish and use video, voice, and data channels. Preferably, the front-end web app is built on the JavaScript API, and third party applications may use this API to build apps that seamlessly integrate with the platform.

The front-end components 300 comprise a web application (or web app) 316, which is a unified communication tool built on iris.js. The web app 316 routes video, voice, and data through the overlay network fabric. The web app also provides (or interfaces to) one or more collaboration functions or technologies, such as video chat, collaborative document editing, desktop sharing, and the like. Because the web app 316 preferably is built in an API (such as iris.js 303, which can support several data channels), it is easily extensible. Thus, users are able to choose which voice, video, and data channels to connect to for a given session—for example, several users in a video conference room could use the room's camera and mic for videoconferencing with a remote site, but each individual user might use his or her personal laptop to edit a shared document. Preferably, the web app 316 is skinnable so it can be rebranded and used by enterprise customers. As noted, because iris.js is built on top of the WebRTC API's, third parties are able to easily adapt existing WebRTC applications to use the solution described herein. The third party applications 318 are depicted here as part of the front-end, but they may be separate and distinct. As noted above, the RESTful API 302 also makes integration with other collaboration tools possible. As also depicted, the front end may include or have associated therewith legacy on-premises equipment 320, such as LifeSize rooms. Further, the front-end may include or have associated therewith native mobile apps 322, such as devices and tablets that run native iOS and Android apps (as opposed to HTML5 apps in mobile browsers, which are also supported). The API layer 302 enables a service provider or third parties to easily build native mobile applications for the solution.

Figure 4:
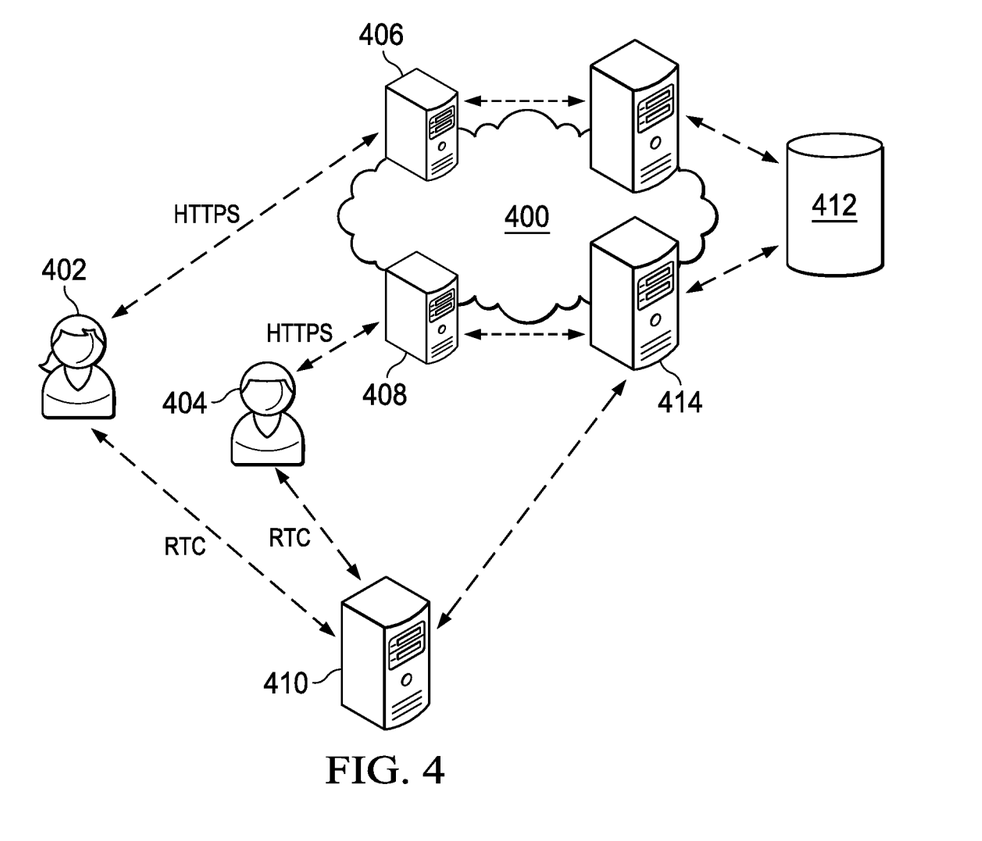
FIG. 4 illustrates a multi-party videoconference setup that is enabled by associating the web-based solution with an overlay network.

In one embodiment, the above-described solution provides a multi-party voice and video chat system. FIG. 4 depicts further implementation details of a multi-party solution implemented within an overlay network 400, such as the Akamai content delivery network (CDN). As depicted, there are two end user peers 402 and 404, and each peer is associated (e.g., using conventional CDN DNS mapping operations) to respective edge servers 406 and 408. Each peer also establishes a WebRTC connection to a media server 410 that hosts the videoconference (in this example scenario). A signaling back-end is powered by a distributed data store 412. In an example implementation, the platform is implemented using a combination of Node.js, PHP, Apache, Cassandra, and Kurento Media server running on Ubuntu Linux machines. Cassandra data is accessed via the RESTful API, which is powered by Node.js running behind an Apache proxy 414. In this approach, signaling information is exchanged via HTTPS interactions using the RESTful API. Multiplexing is accomplished using the Kurento Media Server running on cloud Ubuntu VMs running in geographically-distributed locations. In operation, the Node.js signaling application performs a DNS lookup to the CDN mapping to determine an optimal (in terms of one or more factors such as latency, loss, load, availability, reachability, etc.) media server to which as client should connect. Clients upload their live media stream via WebRTC to the chosen media server. The connection is set up by the signaling layer through the RESTful API. Other clients who wish to subscribe to that media stream connect to the same media server (via the signaling layer) and receive the stream.

While the approach shown in FIG. 4 is typical, it is not a limitation. In an alternative embodiment, the underlying network environment may allow for direct connectivity between peers. This requirement is met among users, for example, as long as peers are connected to an enterprise VPN. Another approach is to use STUN and TURN servers that run, for example, on cloud virtual machine (VM) infrastructure. In still another embodiment, a TURN-compliant version of a relay network for peer-to-peer connectivity may be used. In the multi-party case described above, STUN and TURN are not needed because it is assumed that clients can connect directly to multiplexing servers. Still another approach to connectivity may involve a multicast overlay network to distribute streams.

In this example implementation, the API is powered by a Node.js web application. The Node.js application interacts with Kurento Media Server and Cassandra to orchestrate calls. The "iris.js" JavaScript API is a client-side ECMAScript 6 library that allows web applications to interact with the system via the Iris RESTful API. It contains functionality that allows for easy WebRTC connection management, call orchestration, and automatic, dynamic quality switching, e.g., as the relevancy of different participants in a room changes. The web application is an HTML5 Web App written on top of iris.js. The views are powered by a PHP application.

Constructing 3D Sound Profile of a Room

According to this aspect, it is assumed that there are multiple participants to a conference, such as a videoconference (or even just an audio conference), that is being facilitated using the platform in association with the overlay network. The notion here is to collect audio (and perhaps video) from laptops (or other client devices) of different users in the same room, and to use processing in the cloud to create an ad-hoc, high quality microphone array. This is accomplished, preferably as follows.

The cloud platform first recognizes when multiple laptops (or other client devices) are in the same room using information such as IP address, the HTML5 Location API, and even by correlating audio feeds (i.e., if two users' microphones pick up the same sound, one can say that they are in the same room). Then, by comparing the audio signals from the different microphones in the same room (perhaps with the aid of having laptops/other devices actually make ultrasonic sounds through their speakers), the cloud platform reconstructs their relative positions. Finally, the cloud platform combines the audio feeds of the different clients to create a high-fidelity room audio feed. The end result is similar to that of using a microphone array and conferencing equipment, but without a "smart" client.

Figure 5:
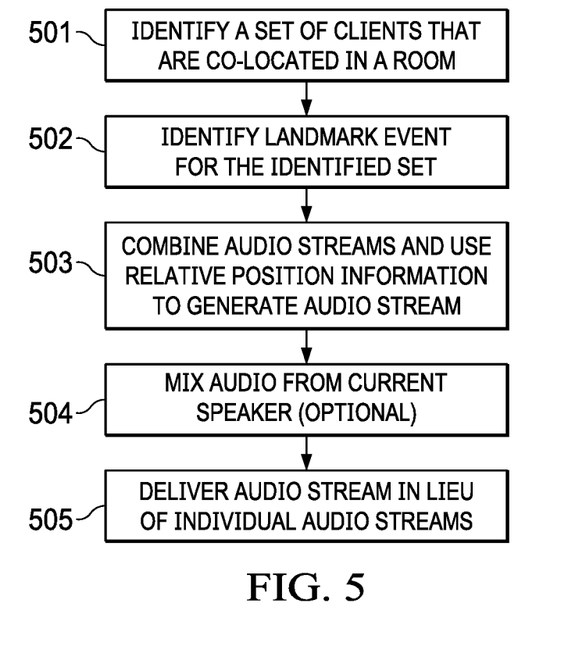
FIG. 5 depicts a process flow of a sound profile creation routine of this disclosure.

It is assumed that the "clients" are browsers that are participating in a real-time multiparty WebRTC call. Each browser is sending its real-time audio feed to a cloud platform such as described above via WebRTC. The following operations (as depicted in FIG. 5) are then carried out, preferably in the cloud:

At step (501), the cloud platform identifies a set of clients in a multiparty call who are all in the same physical room. Preferably, this determination is made using the one or more of the following information: the clients' IP addresses, the clients' physical locations (collected with client-side JavaScript using the HTML5 Geolocation API (if available) and reported back to the platform via RESTful HTTPS requests), explicit client input (e.g., client-side JavaScript exposes a UI element to the end user, and the end user can explicitly specify what room they are in, and the client reports this back to the platform via RESTful HTTPS requests); and passive correlation of the content of each individual audio stream. For example, if one person is speaking in a room, all microphones in that room will pick up that person's speech. Preferably, the cloud platform uses both expert-system and machine learning techniques to determine that the audio from all microphones are listening to the same audio source. This may be accomplished using algorithms that determine that the streams are highly correlated. In one embodiment, the training set for a machine learning algorithm comes from audio streams that have been verified to be in the same room by explicit client input and by active correlation. To facilitate active correlation of each audio stream, client-side JavaScript makes the speakers on each individual client machine emit a sound at an ultrasonic frequency inaudible to humans. Each client will emit a uniquely identifiable sound. If this sound is present in any other client audio stream, that other client is in the same room.

At step (502), and once a set of clients have been identified to be in the same room, the cloud platform compares "landmark" events in each audio stream—these are events that correspond to the same sound. For example, a landmark event may be a person saying a particular word, or the uniquely identifiable sounds from the active correlation method. By comparing the relative timing and loudness of these landmark events, the platform uses triangulation to infer the relative position and orientation of each microphone.

At step (503), the platform combines the individual audio streams from each microphone and uses the relative position information to render a single (stereo or multichannel surround) audio stream which represents a high-quality 3D recording of the audio in the room.

At step (504), the platform mixes audio from the different microphones to enhance the audibility of the person currently speaking.

At step (505), and rather than delivering the audio received from individual clients' microphones, the platform delivers to the other clients the high-quality stereophonic/surround audio stream computed from step (503). Other clients play back this high quality stream to get a high-fidelity 3D representation of the audio in the target room.

The multi-party collaboration solution of this disclosure has significant advantages. It enables seamless video conferencing directly within the user's browser. No plugins, downloads or special equipment (beyond a webcam) are needed. The approach enables web-based multi-party video conferencing. The technique enables direct point-to-point and multi-party communications (video conferencing, and real time screen sharing, document collaboration, etc.) between and among end users through the overlay network fabric.

To support the techniques herein, and depending on the implementation of the underlying distribution, the overlay network fabric provides support for multipath packet transport, as described in U.S. Pat. Nos. 6,665,726 and 6,751,673, assigned to Akamai Technologies, Inc. The various connections used in the overlay network and as described typically are secured via SSL or other transport layer security (TLS) techniques. Further, the use of the overlay network to provide a peer-to-peer relay as described in U.S. Pat. No. 9,137,196 may also be utilized. That approach facilitates implementation of the TURN protocol ("Traversal Using Relay NAT," as specified in Internet Request for Comment 5766), as well as STUN protocol, as described in RFC 3489. In the relay approach, each peer executes an application (e.g., a video calling application), and the peers communicate with one another, preferably using a relay service established by the overlay network service provider. The overlay network comprises sets of servers, typically organized as edge regions. Each region typically comprises multiple edge servers, each of which is a machine such as has been described above. An edge region may comprise a single relay server. A directory service, which may be part of the overlay network or a service associated with a third party, is used to facilitate communications between the peers even if each peer is behind a NAT device. In the relay approach, each client (a peer) has a connection to a directory service. The directory service performs DNS lookups to determine which overlay network relay server (a virtual IP, or VIP) to which each of the clients should connect. The directory service then tells each client the VIP it should use and the VIP the other machine will use. The directory service also assigns a unique connection ID for the end-to-end connection. Each client then sends a session allocation request to the assigned overlay relay server. The allocation request includes the connection ID and the remote peer's relay server VIP. The overlay relay server responds with the NAT IP/port that was provisioned for the connection. The information is relayed to the remote peer via the directory service. Each client then sends a channel binding request to its assigned overlay relay server, indicating the NAT IP/port of the remote peer. At this point, each overlay relay server is aware of all necessary identifying information for the connection, namely: connection ID, each client's NAT IP/port, and each client's relay server VIP (and service port, if it is necessary for the port to be different).

Each above-described process preferably is implemented in computer software as a set. of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

Having described my invention, what is claimed is as follows.

The invention claimed is:

1. Apparatus associated with an overlay network, comprising:
   a hardware processor; and
   computer memory holding computer program instructions executed by the hardware processor, the computer program instructions comprising program code executed to carry out operations, the operations comprising:
      given a set of audio streams that comprise a conference, identifying a set of clients in the conference that are co-located with one another using one of: passive correlation, and active correlation;
      for the identified set of clients, identifying at least one event that is found in each of the audio streams;
      with respect to the at least one event, comparing a relative characteristic associated with the event, and using the relative characteristic to infer a relative physical position of each client in the set of clients;
      combining individual audio streams received from the clients and using the relative physical position to render a single audio stream; and
      in lieu of delivering individual ones of the audio streams, delivering the single audio stream via the overlay network.

2. The apparatus as described in claim 1 wherein the operations further comprise mixing an audio stream corresponding to a person currently speaking with the single audio stream to enhance audibility of the person currently speaking.

3. The apparatus as described in claim 1 wherein the single audio stream is delivered using an HTML5 Web Audio Application Programming Interface (API).

4. The apparatus as described in claim 1 wherein the single audio stream is a stereo or multichannel surround audio stream.

5. The apparatus as described in claim 4 wherein a single stereo or multichannel surround audio stream is delivered for rendering in a web browser.

6. The apparatus as described in claim 1 wherein the set of clients are identified using one of: client IP addresses, and a client physical location.

7. The apparatus as described in claim 6 wherein the client physical location is determined using an HTML5 geolocation API and received via a RESTful HTTP request.

8. The apparatus as described in claim 1 wherein the overlay network is a content delivery network (CDN).

\* \* \* \* \*